July 3, 1928.
S. B. WHITESIDE
ICE CREAM DIPPER
Filed July 21, 1926
1,675,776
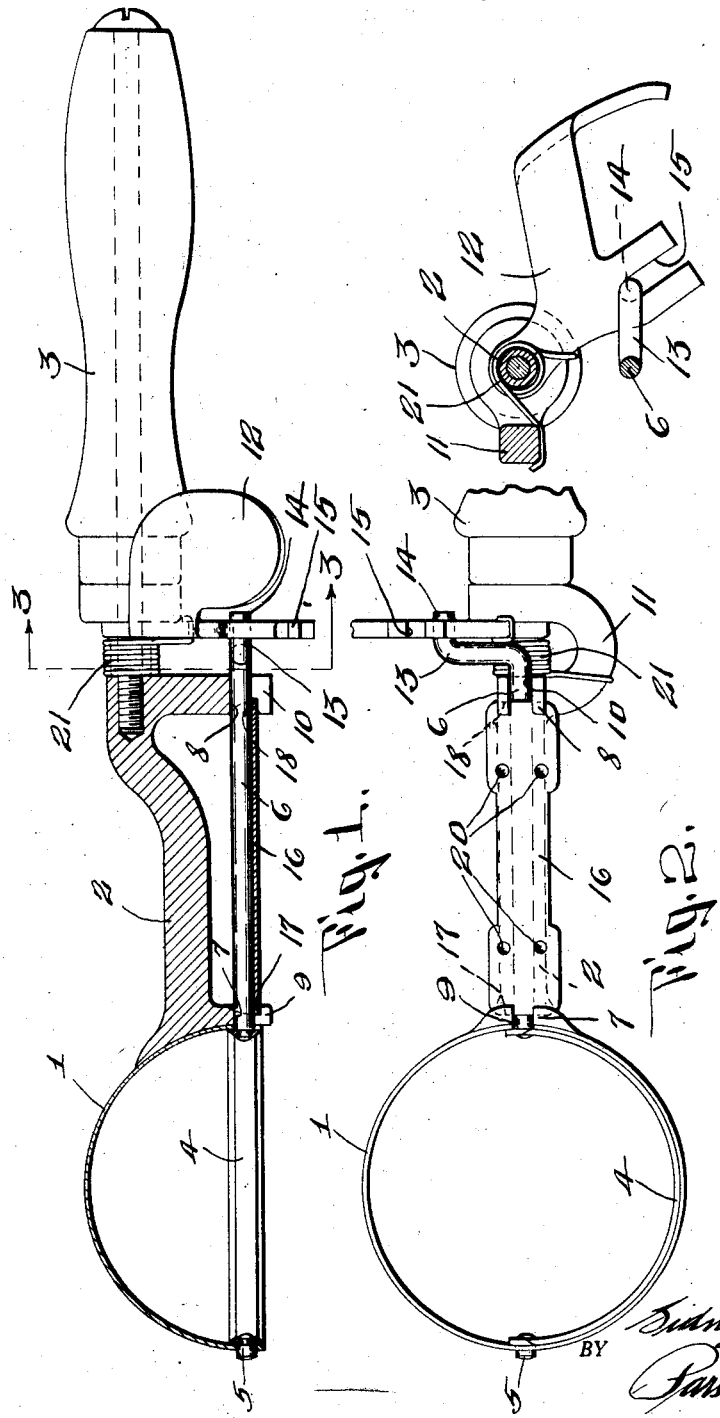
INVENTOR.
Sidney B Whiteside
BY
Parsons & Birdsell
ATTORNEYS.

Patented July 3, 1928.

1,675,776

UNITED STATES PATENT OFFICE.

SIDNEY B. WHITESIDE, OF NEW YORK, N. Y.

ICE-CREAM DIPPER.

Application filed July 21, 1926. Serial No. 124,042.

This invention relates to ice cream dippers and has for its object a particularly simple and efficient mechanism for actuating the scraper of the dipper and particularly a mechanism whereby a comparatively small movement of the actuating lever is transferred to the scraper to move the same through an arc of approximately 180° without using gearing or a rack and pinion.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section, of an ice cream dipper embodying my invention.

Figure 2 is a view looking upwardly in Figure 1, the handle being broken away.

Figure 3 is a sectional view on line 3—3, Figure 1.

This ice cream dipper comprises, generally, a bowl carried by a body or a shank extending laterally from the bowl, the shank also having a handle, a scraper movable about an axis extending transversely of the bowl, a shaft on which the scraper is mounted, the shaft extending lengthwise of the shank and operating means including a lever movable about an axis extending lengthwise of the shank and motion transmitting and multiplying means between the lever and the shaft whereby a comparatively small movement of the lever as through an arc of say about 90° is transferred into a movement of approximately 180° in the scraper.

1 designates the bowl carried by a body or shank 2 having a handle 3, the bowl being semispherical.

4 is the scraper movable in the bowl through an arc of 180°, this scraper having a lug 5 at one end which enters suitable hole or bearing in the rim of the bowl, and being mounted at its other end on a rock shaft 6 extending lengthwise of the shank 2, the shank having spaced apart bearings 7 and 8 in which the shaft 6 is mounted. The bearings are open at 9 and 10 on one side thereof for a purpose to be presently described.

The bearing 9 is formed in that portion of the shank lying adjacent of the bowl 1. The shank is formed with a loop or offset 11 at its rear end or the end adjacent the handle 3.

In the illustrated embodiment of my invention, the actuating mechanism includes a thumb lever 12 pivoted on a stud or other support arranged in the loop 11 and in line with the handle 3 and shank 2, the thumb lever being movable transversely of the rock shaft and having a detachable motion transmitting connection with the rock shaft. The rock shaft is preferably parallel to the shank 2 and with the axis of the lever 12.

The rock shaft is here shown as provided with a crank 13 having an eccentric pin 14 coacting with the lever and owing to the fact that the axes of the lever and the shaft are spaced apart and the lever coacts with the rock shaft, the crank or the eccentric pin thereof is of less radius than that of the lever or the point of the lever which coacts with the crank pin.

As here shown, the lever 12 is formed with a slot 15 extending in a general radial direction for receiving the pin 14, the slot being open at its outer end for facilitating the removal of the shaft from its open sided bearings, the bearings being open sided in order to permit the removal of the scraper and its shaft for cleaning the bowl and the scraper and other parts.

The shaft is held in its bearings by means detachably engaged with the shank or the bearings thereof and with the shaft. This means being shown as a retaining plate 16 extending between the bearings 9, 10 and extending at its ends in notches 17, 18 in the opposing sides of said bearings. The retaining plate has projections 20 arranged to come astride the shaft or snap into engagement with the shaft so that one is on one side of the shaft the other on the other side of the shaft, the projections holding the retaining plate from lateral shifting movement when its ends are interlocked with the notches 17, 18 of the bearings 7, 8. There are two pairs of projections 20 spaced apart lengthwise of the retaining plate 16.

A suitable retaining spring 21 is coiled about the pivot pin of the thumb lever 12 and is anchored at one end against the shank 2 and presses against the lever at its other end.

This operating mechanism is particularly simple in construction as there are no gear teeth and is sanitary for the same reason, as rack and pinions accumulate dirt.

Also, owing to the pin and slot connection and to the open sided bearings, the scraper is readily removed for the purpose of being cleaned. Also, owing to the lever, crank, and pin and slot construction a particularly simple and compact mechanism is provided for transferring a small movement of the thumb lever into a great movement of the scraper. To remove the shaft the lever 12 must be moved about its axis so that the outer open end of the slot 15 of the lever 12 is presented in nearly the same direction or is in a row with the open sided bearings for the rock shaft.

What I claim is:—

1. In an ice cream dipper, the combination of a bowl, a scraper movable about an axis extending transversely of the bowl, a body comprising a shank projecting from the bowl, a rock shaft on which the scraper is mounted extending lengthwise of the shank, and operating means including a lever movable about an axis extending in the same direction as that of the rock shaft, the rock shaft having an eccentric pin and the lever having a slot extending in a general radial direction for receiving the pin, the slot being located a greater radial distance from the axis of the lever than the radius of said pin.

2. In an ice cream dipper, the combination of a bowl, a scraper movable about an axis extending transversely of the bowl, a body comprising a shank projecting from the bowl, a handle carried by the shank, a rock shaft on which the scraper is mounted, extending in a direction lengthwise of the shank, a thumb lever pivoted on the shank on an axis extending lengthwise of the shank and motion transmitting means between the thumb lever and the rock shaft comprising eccentric parts carried respectively by the thumb lever and the rock shaft and having sliding connection with each other.

3. In an ice cream dipper, the combination of a bowl, a scraper movable about an axis extending transversely of the bowl, a shank projecting from the bowl, a handle carried by the shank, a rock shaft on which the scraper is mounted, extending in a direction lengthwise of the shank, a thumb lever pivoted on the shank on an axis extending lengthwise of the shank, the rock shaft having an eccentric pin, the thumb lever having a slot extending in a radial direction for receiving the pin, the slot being a greater radial distance from the axis of the lever than the radius of said pin.

4. In an ice cream dipper, the combination of a bowl, a scraper movable about an axis extending transversely of the bowl, a shank projecting from the bowl, a handle carried by the shank, a rock shaft on which the scraper is mounted extending in a direction lengthwise of the shank, a thumb lever pivoted on the shank on an axis extending lengthwise of the shank, the rock shaft having an eccentric pin, the thumb lever having a slot extending in a radial direction for receiving the pin, the slot being a greater radial distance from the axis of the lever than the radius of said pin, and a spring for returning the thumb lever to its starting position.

5. In an ice cream dipper, the combination of a bowl, a scraper movable about an axis extending transversely of the bowl, a body comprising a shank projecting from the bowl, and having a handle, the body being formed with bearings for the shaft open at one side, means for holding the shaft in the bearings and actuating means for the shaft including a lever pivoted to the body and having a detachable connection with the shaft.

6. In an ice cream dipper, the combination of a bowl, a scraper movable about an axis extending transversely of the bowl, a body comprising a shank projecting from the bowl and having a handle, the body being formed with bearings for the shaft open at one side, means for holding the shaft in the bearings and actuating means for the shaft including a lever having a pin and slot connection with the shaft, the slot being open at one end.

7. In an ice cream dipper, the combination of a bowl, a scraper movable about an axis extending transversely of the bowl, a body comprising a shank projecting from the bowl, a rock shaft on which the scraper is mounted extending in a direction lengthwise of the shank, operating means including a lever movable about an axis extending in the same direction as that of the rock shaft and motion transmitting and multiplying mechanism between the lever and the rock shaft, the body being formed with bearings open at one side for the rock shaft, and the lever of the motion transmitting and multiplying mechanism having a slot open at one end for receiving a part of said mechanism carried by the shaft.

8. In an ice cream dipper, the combination of a bowl, a scraper movable about an axis extending transversely of the bowl, a body comprising a shank projecting from the bowl, a rock shaft on which the scraper is mounted extending in a direction lengthwise of the shank, and operating means including a lever pivoted to the body on an axis extending in the same general direction as that of the rock shaft, motion transmitting and multiplying mechanism between the lever and the rock shaft, the body being formed with bearings open at one side for the rock shaft and the lever, and the part of the motion transmitting and multiplying mechanism carried by the shaft being detachably coupled together.

9. In an ice cream dipper, the combination of a bowl, a scraper movable about an axis extending transversely of the bowl, a body comprising a shank projecting from the bowl, a rock shaft on which the scraper is mounted extending lengthwise of the shank, operating means including a lever movable about an axis extending in the same general direction as that of the rock shaft, the rock shaft having an eccentric pin and the lever having a slot extending in a general radial direction for receiving the pin, the slot being located a greater radial distance from the axis of the lever than the radius of the pin, the body being formed with bearings open at one side for the rock shaft.

10. In an ice cream dipper, the combination of a bowl, a scraper movable about an axis extending transversely of the bowl, a shank projecting from the bowl and having a handle, the shank being formed with bearings open at one side for the shaft, the bearings being spaced apart and being formed with notches, and a retaining plate located between the bearings and interlocking at its ends with the notches.

11. In an ice cream dipper, the combination of a bowl, a scraper movable about an axis extending transversely of the bowl, a shank projecting from the bowl and having a handle, the shank being formed with bearings open at one side for the shaft, the bearings being spaced apart and being formed with notches, and a retaining plate located between the bearings and interlocking at its ends with the notches, the bearing plate having projections arranged astride the shaft.

12. In an ice-cream dipper, the combination of a bowl, a scraper movable about an axis extending transversely of the bowl, a shank projecting from the bowl, a handle carried by the shank, a rock shaft on which the scraper is mounted extending in a direction lengthwise of the shank, a thumb lever pivoted to the shank, the rock shaft having an eccentric pin and the thumb lever having a cam slot for receiving the pin.

In testimony whereof, I have hereunto signed my name, at New York, in the county of New York, and in the State of New York, this 19th day of July, 1926.

SIDNEY B. WHITESIDE.